United States Patent
Madonia

[11] 3,752,448
[45] Aug. 14, 1973

[54] DOUGH CONDITIONING APPARATUS

[76] Inventor: Anthony F. Madonia, 19 Middlebury Ln., Buffalo, N.Y. 14216

[22] Filed: Sept. 15, 1971

[21] Appl. No.: 180,650

Related U.S. Application Data

[63] Continuation-in-part of Ser. No. 83,339, Oct. 23, 1970.

[52] U.S. Cl. .................. 259/186, 259/6, 425/238
[51] Int. Cl. ....... B01f 7/02, B01f 15/02, A21c 1/06
[58] Field of Search .................. 259/6, 21, 41, 104, 259/185, 186, DIG. 8, DIG. 12; 425/204, 238, 239

[56] References Cited
UNITED STATES PATENTS

| | | | |
|---|---|---|---|
| 1,326,930 | 1/1920 | Hewitt | 425/239 |
| 1,782,006 | 11/1930 | Kremmling | 425/239 X |
| 3,030,898 | 4/1962 | Freed | 259/185 |
| 2,953,460 | 9/1960 | Baker | 259/104 X |
| 3,164,107 | 1/1965 | Oakes et al. | 259/6 X |
| 2,844,362 | 7/1958 | Lombi | 259/104 |

FOREIGN PATENTS OR APPLICATIONS 317,833    1/1920    Germany .......................... 425/239

Primary Examiner—Wayne A. Morse, Jr.
Assistant Examiner—Alan I. Cantor
Attorney—Christel & Bean

[57] ABSTRACT

A hopper for receiving a dough mixture directly from a mixing chamber and gravity feeding the same to a dough divider. A plurality of agitator rods mounted in the hopper condition and work the dough mixture to dispel excessive gases generated therein and render the mixture soft, elastic and of a uniform consistency and texture prior to the admission of the mixture directly into a dough divider.

3 Claims, 5 Drawing Figures

INVENTOR.
Anthony F. Madonia
BY
Christel & Bean
ATTORNEYS.

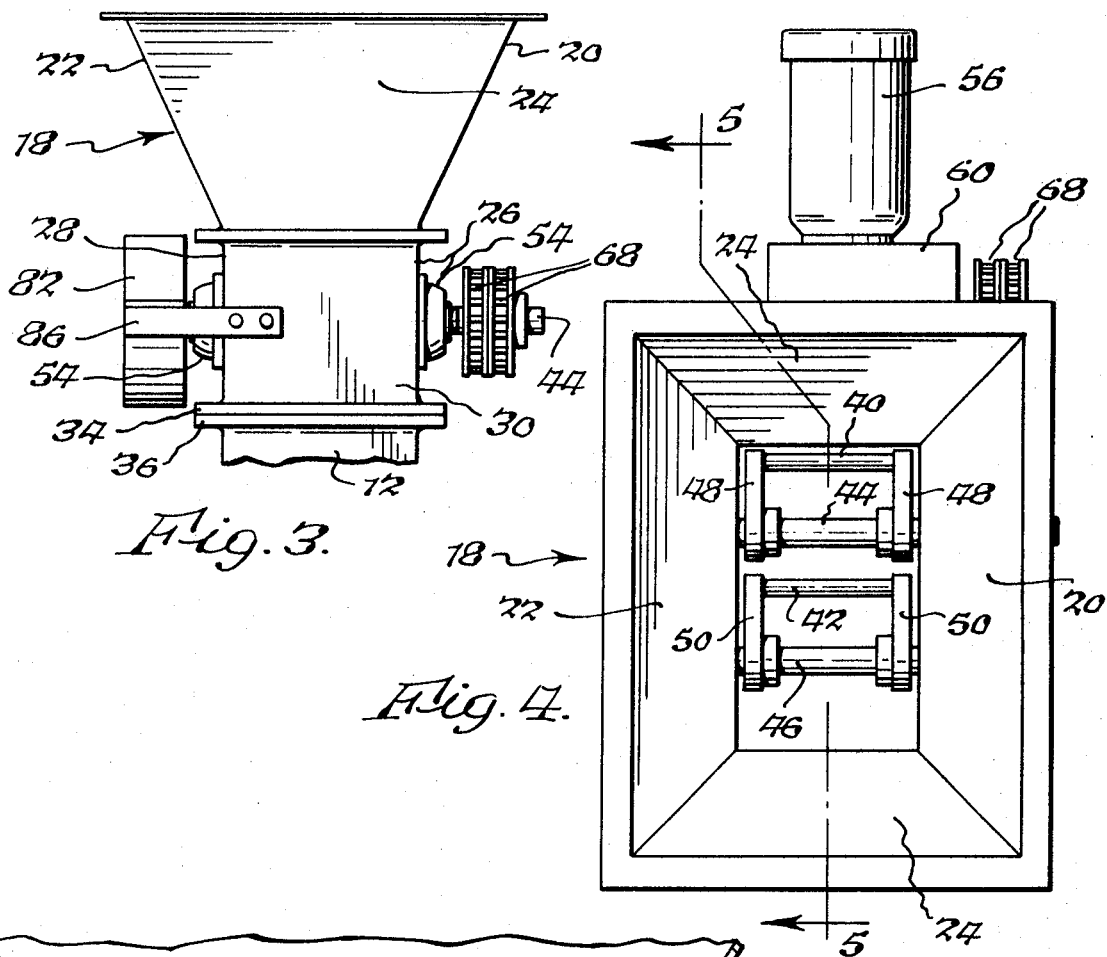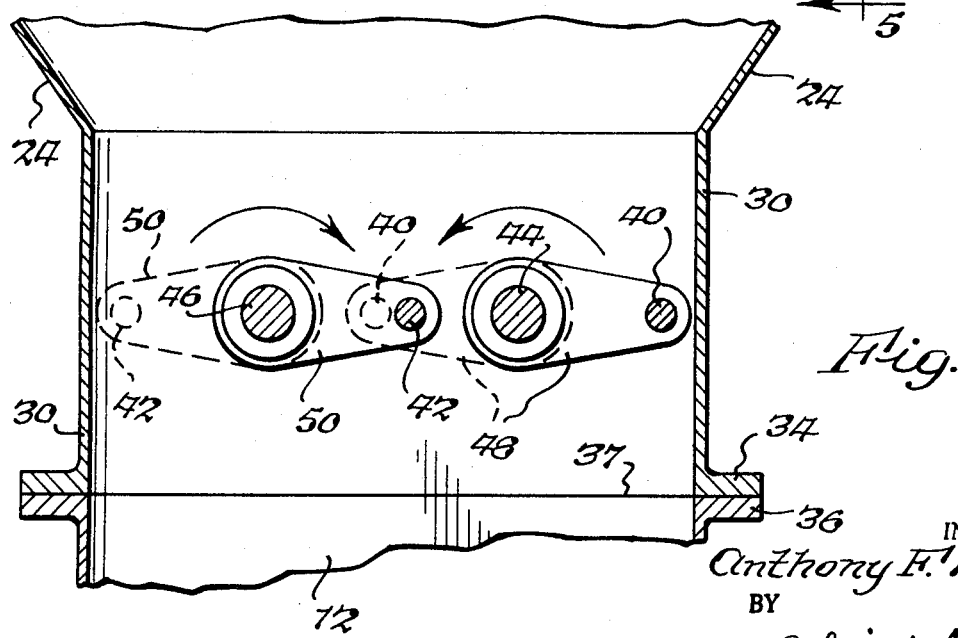

DOUGH CONDITIONING APPARATUS

CROSS-REFERENCE TO A RELATED APPLICATION

This application is a continuation-in-part of application Ser. No. 83,339, filed Oct. 23, 1970 on a Dough Conditioning Apparatus.

BACKGROUND OF THE INVENTION

This invention relates generally to a dough forming apparatus and, more particularly, to apparatus for conditioning or texturizing dough prior to dividing the latter into discrete bodies to form buns, rolls, loaves, and the like.

In the usual dough forming operations, an alimentary paste or dough mixture is formed in a mixing chamber by homogeneously admixing the necessary ingredients, such as water, salt, flour and yeast in the quantities desired by the user. The dough mixture is then deposited in a hopper which gravity feeds the mixture to a degassing apparatus for dispelling some of the gases present in the dough mixture. The finished product is then discharged from the degassing apparatus into a hopper which gravity feeds the dough mixture into a "divider" for dividing the latter into discrete bodies to form rolls, buns, etc., which are ultimately fed into the "proofer" or baking oven.

During the course of natural fermentation of the dough mixture, gases are generated in the mixture and form pockets therein. While a certain amount of gas retention in the dough mixture is desirable to facilitate the rising thereof in the proofer to obtain a quality baked product, an excessive amount of gas in the dough adversely affects the texture and consistency thereof due to the formation of large uneven gas pockets therein and results in an inferior finished product. An excessive gas build-up can occur when a batch of dough is allowed to remain idle for a short period of time since it continues to ferment and expand.

Attempts have been made to overcome these deficiencies by employing degassing units interposed between the hopper and the divider to expel the gases formed in the dough mixture. While these known dough degassers, which are bulky, expensive and costly to maintain, dispel some of the gases, they are not entirely satisfactory. Since a major portion of the dough mixture remains temporarily idle prior to entry into the degasser, it generates these large, nonuniform gas pocket formations or bubbles and the longer such portion remains idle, the greater is the degree of gas generation therein. As the extent of gassing increases, the efficiency of the degassing unit decreases proportionately so that the effectiveness of the degassing unit varies from the beginning of a batch to the end thereof producing a nonuniform yield having a major portion which is coarse and rough finished and substantially inferior in appearance and quality from that portion of the batch immediately processed through the degassing unit. Such an inferior yield has poor oven spring resulting in baked products that are nonuniform in size because of poor scaling, contain air holes and pockets, crust blisters, and are spotty and dull in appearance. Sometimes the finished baked product is unacceptable and must be scrapped. The invention disclosed and claimed in application Ser. No. 83,339, filed Oct. 23, 1970, obviated the above disadvantages by providing a novel dough conditioning apparatus for maintaining the dough mixture soft, pliable, smooth and uniform in texture by continually stretching and working the same.

SUMMARY OF THE INVENTION

I have discovered that the apparatus for conditioning and texturizing a dough mixture, as described in my application Ser. No. 83,339, filed Oct. 23, 1970, can be located in close proximity to a dough divider for directly discharging the conditioned dough into the latter thereby eliminating the necessity of the costly dough degasser conventionally used.

This invention is characterized by the provision of a dough conditioning apparatus of the type described in Application Ser. No. 83,339 mounted between a dough forming apparatus and a dough divider for directly receiving a dough mixture from the former, working such mixture to render the same soft, pliable and of a uniform texture, and discharging such conditioned dough directly into the divider located in close proximity to the dough conditioning apparatus.

BRIEF DESCRIPTION OF THE DRAWINGS

FIG. 3 is a fragmentary side elevational view thereof;

FIG. 4 is a top plan view of the dough conditioning apparatus of this invention; and FIG. 5 is a vertical sectional view, on an enlarged scale, taken about on line 5—5 of FIG. 4.

DETAILED DESCRIPTION OF AN ILLUSTRATIVE EMBODIMENT

Figure 1:
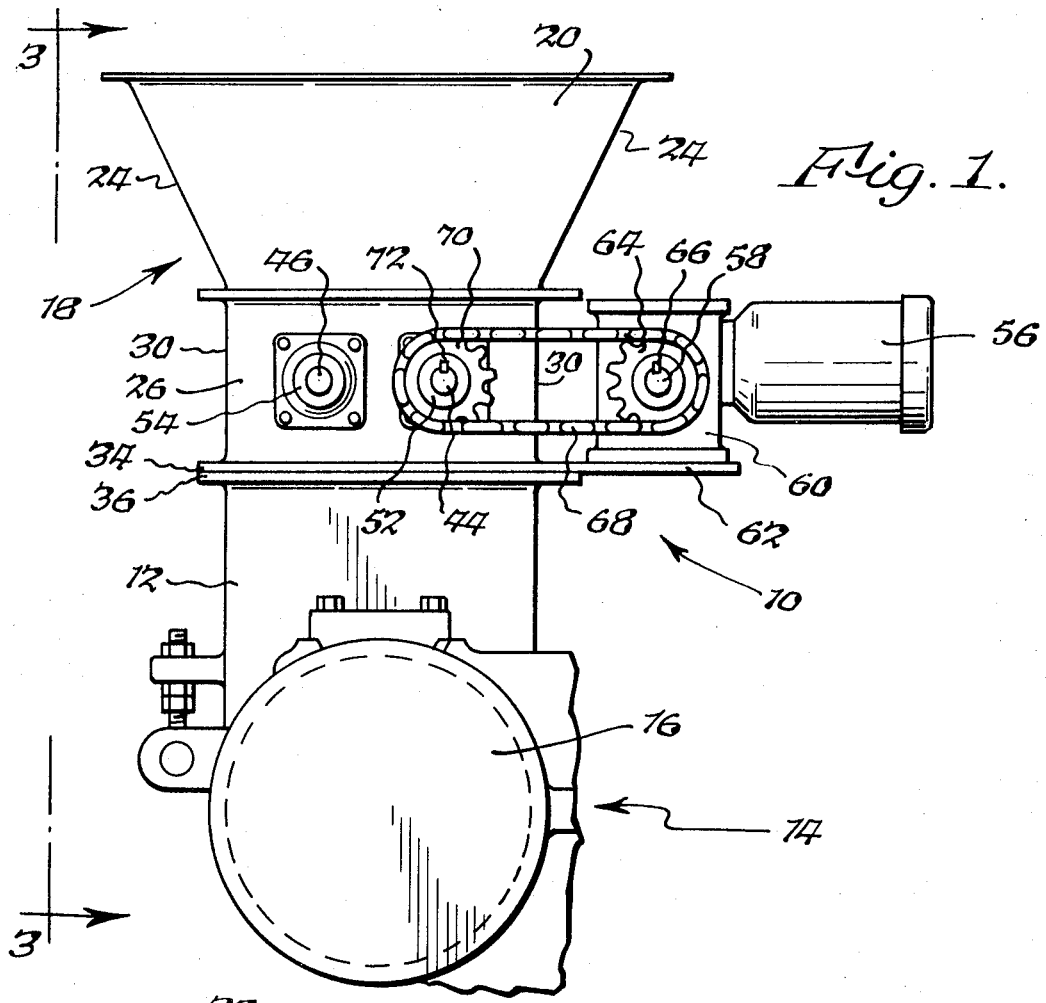
FIG. 1 is a fragmentary front elevational view of a dough processing apparatus constructed in accordance with this invention.

Referring now in detail to the illustrative embodiment depicted in the drawings, there is shown a dough processing apparatus, constructed in accordance with this invention and generally designated 10, rigidly secured to a fixed hopper 12 forming a part of a dough divider 14. As is well known in the art, divider 14 includes a rotatable cylinder 16 having a plurality of longitudinally spaced and aligned reciprocable plungers (not shown) for dividing the mass of dough received from hopper 12 into discrete bodies, which are discharged from divider 14 onto a conveyor arrangement, also not shown, and ultimately formed into baked rolls, buns, loaves, and the like. Conventional dough dividers 14 may be provided with removable hoppers mounted on divider hopper 12, as desired.

In accordance with this invention, the dough conditioning apparatus 10 includes a feed hopper, generally designated 18, adapted to receive the dough mixture directly from a mixing apparatus, not shown, which thoroughly admixes the necessary ingredients such as flour, water, salt and yeast, in the quantities desired by the user. Hopper 18 comprises an upper portion of a generally inverted truncated prism configuration and a lower portion of generally rectangular configuration formed integral with the upper portion. The upper portion comprises an inclined front wall 20, an inclined rear wall 22, and a pair of inclined side walls 24 extending downwardly at an angle in a converging relation. The lower portion of hopper 18 comprises a front wall 26, a rear wall 28 parallel to wall 26, and a pair of parallel side walls 30. A laterally extending flange 32 is provided at the juncture of the upper and lower portions of hopper 18. A flange 34 also is provided at the bottom end of hopper 18 for engagement with and connection to a supporting flange 36 provided about the inlet 37 of divider hopper 12. As shown in FIG. 5, the outlet of the lower portion of hopper 18 communicates with and has substantially the same inside cross sectional dimensions as inlet 37 of divider hopper 12.

A significant feature of this invention is the provision of means within hopper 18 for conditioning and texturizing the dough mixture received in hopper 18 directly from the dough blending or mixing apparatus by thoroughly working such dough mixture to obtain a uniform texture and consistency thereof prior to introducing the same into the divider. Such means comprise a pair of laterally spaced agitators or rods 40 and 42 (FIGS. 4 and 5) disposed in a parallel relation and driven by a pair of laterally spaced, parallel shafts 44 and 46, respectively. Rod 40 is connected to shaft 44 by means of longitudinally spaced crank arms 48 mounted on the opposite ends of shaft 44. In a similar construction, rod 42 is connected to shaft 46 by a pair of longitudinally spaced crank arms 50 mounted on the opposite ends of shaft 46. The opposite ends of shafts 44 and 46 are journalled for rotation in suitable bearings 52 and 54 mounted in front and rear walls 26 and 28, respectively.

The means for rotating shafts 44 and 46 includes an electric motor 56 connected to a suitable source of electric power (not shown) and coupled to a drive shaft 58 by means of a suitable gear reduction mechanism 60 mounted on an extension 62 of flange 34. As shown in FIG. 1, motor 56 is suitably mounted on gear reduction mechanism 60. A drive sprocket 64 is rigidly secured to shaft 58 as by means of a keying arrangement 66 for driving an endless drive chain 68, also trained about a sprocket 70 secured to the forward end of shaft 44 projecting outwardly from front wall 26 as by means of a key 72.

Figure 2:
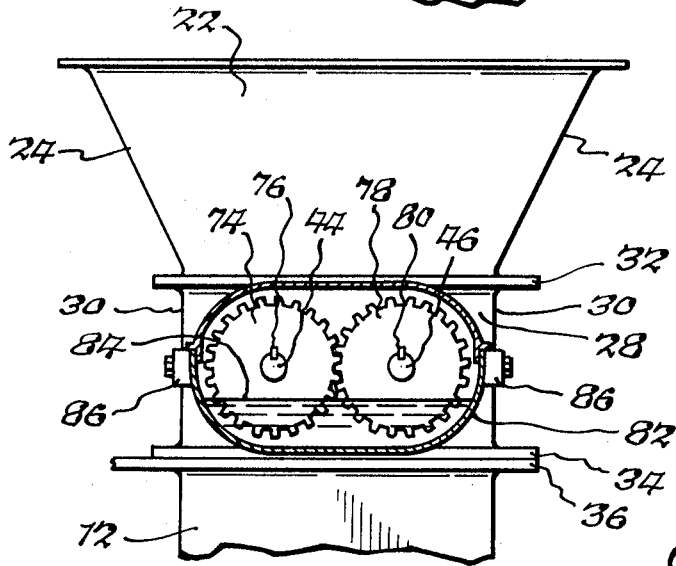
FIG. 2 is a fragmentary rear elevational view, partly in section, of the apparatus of FIG. 1.

The rear end of shaft 44 (FIG. 2) projects through rear wall 28 and is provided with a gear 74 keyed thereto as at 76. Gear 74 meshes with a gear 78 suitably keyed, as at 80, to the rearwardly projecting end of shaft 46 to transmit the rotary motion of shaft 44 to shaft 46 but in an opposite direction. Gears 74 and 78 are enclosed within a fluid tight casing or housing 82 having a predetermined level of oil 84 contained therein to maintain gears 74 and 78 lubricated. Housing 82 is rigidly secured to the lower portion of hopper 18 by a pair of brackets 86 affixed to side walls 30.

While the illustrative embodiment utilizes only one pair of agitator rods 40 and 42, it should be understood that two pairs of agitator rods can be employed, as dictated by the size of hopper 18, and operatively connected to the same drive arrangement provided for rods 40 and 42.

In operation, the raw materials or dough ingredients are thoroughly mixed in a mixing chamber to produce a mass or batch of homogeneously mixed dough, which is deposited directly into hopper 18 without passing through an intermediate degassing stage. Rods 40 and 42 are driven in opposite directions, as indicated by the arrows in FIG. 5, in overlapping or intersecting circular, orbital paths. Since rods 40 and 42 are angularly offset or oriented 180° from each other and rotated at the same relatively slow rate of speed in opposite directions, they will not collide with each other during their revolving motion in these circular paths. The engagement of revolving rods 40 and 42 with the dough mixture in the lower portion of hopper 18 continuously grabs, lifts, stretches and folds the dough slowly to maintain the dough soft and elastic and to fragment the larger gas bubbles into smaller bubbles of uniform size, dispelling some of the gases while retaining the necessary amount of gas in the dough mixture to obtain a high quality finished product. These revolving rods maintain the dough mixture in a soft, pliable, velvety and smooth condition throughout the entire run or batch of dough so that the last portion thereof to enter divider 14 has the same fresh appearance and properties as the first portion admitted to divider 14. Also, the worked or conditioned dough has excellent flow characteristics enabling it to readily fill the forms in the baking pans and rise more uniformly in the proofer. As a result, the dough received in the plunger chambers of divider 14 just below agitator rods 40 and 42 is of a uniform consistency and texture to form discrete bodies of uniform, high quality. In the event of stoppage or mechanical breakdown, the idle dough, conditioned by agitator rods 40 and 42, retains its freshness and softness for a longer period of time than unconditioned dough so that the necessity of scrapping the dough is avoided.

As a result of this invention, a dough conditioning apparatus, in the form of agitator rods mounted within a hopper, is mounted in the path of flowing dough between a dough blending or forming machine and a dough divider for working the dough fed thereto to expel excessive gases generated therein and to render the dough soft and elastic so that the divider receives a dough mixture of uniform consistency and texture. The dough conditioner is interposed between the dough forming apparatus and the dough divider for directly receiving the dough mixture from the former and directly discharging the conditioned dough into the divider located closely adjacent the agitator rods. Baked products made from dough processed through the conditioning apparatus of this invention have improved flavor and appearance, are bold, full bodied, uniform in grain and texture, and have a longer shelf life.

An illustrative embodiment of this invention having been disclosed in detail, it is to be understood that this has been done by way of illustration only.

I claim:

1. In a dough processing system including a dough divider having an inlet, a hopper for receiving a thoroughly mixed and fully developed dough mixture, said hopper having a lower portion in communication with said divider inlet, and means mounted in said hopper lower portion in close proximity to said divider for conditioning said dough mixture to dispel excessive gases generated therein and to maintain the dough mixture in a soft and elastic condition of substantially uniform consistency prior to the admission of said mixture into said divider inlet, said conditioning means comprising a pair of laterally spaced, parallel drive shafts journalled in said hopper lower portion, a pair of agitator rods extending parallel to said drive shafts, respectively, in spaced relation thereto, and means for rotating said drive shafts in opposite directions whereby said rods are revolved in intersecting orbital paths, said rods being angularly offset from each other to preclude collision therebetween.

2. The combination of claim 1 wherein said rods are oriented 180° from each other.

3. The combination of claim 1 wherein said connecting means comprises a pair of longitudinally spaced crank arms mounted at their one ends adjacent opposite ends of said drive shafts, and means at the other ends of said longitudinally spaced crank arms for securing the opposite ends of each of said rods thereto.

* * * * *